United States Patent [19]

Tünkers

[11] 4,240,620

[45] Dec. 23, 1980

[54] GRIPPING ARRANGEMENT

[75] Inventor: Josef-Gerhard Tünkers, Ratingen, Fed. Rep. of Germany

[73] Assignee: Tuenkers GmbH, Ratingen, Fed. Rep. of Germany

[21] Appl. No.: 21,839

[22] Filed: Mar. 19, 1979

[30] Foreign Application Priority Data

Mar. 30, 1978 [DE] Fed. Rep. of Germany ....... 2813694

[51] Int. Cl.[3] .................................................. B23Q 3/02

[52] U.S. Cl. .......................................... 269/24; 269/32; 269/94; 91/399; 91/400; 91/401

[58] Field of Search .......................... 91/399, 401, 402; 269/91, 93, 94, 32, 237, 24, 20, 27, 30

[56] References Cited

U.S. PATENT DOCUMENTS 3,735,632 5/1973 Hilton .................................... 91/399

FOREIGN PATENT DOCUMENTS 2222686 11/1973 Fed. Rep. of Germany ............. 269/94

*Primary Examiner*—Robert C. Watson

*Attorney, Agent, or Firm*—Michael J. Striker

[57] ABSTRACT

A gripping arrangement includes a gripping member operatively connected with a differential both-side acted piston movable in a pneumatic or hydraulic cylinder. The piston stroke includes a first step and a second step. The pressure acted upon the piston to move the same into the respective gripping position is partially counteracted at the first step so as to eliminate an undesirably fast movement of the gripping member during at least initial portion of the stroke. The remaining portion of the stroke the piston moves under full pressure exerted by the pressure medium supplied in the cylinder without any counteracting effect.

13 Claims, 4 Drawing Figures

GRIPPING ARRANGEMENT

BACKGROUND OF THE INVENTION

The present invention relates to gripping devices.

More particularly this invention concerns hydraulic or pneumatic gripping devices provided with a differential pressure cylinder.

It is known in the prior art of pressuremedium operated gripping devices to provide a cylinder with a piston which is movable longitudinally within the cylinder. Such gripping devices are used for example for clamping, pressing, cutting or stamping, etc., a workpiece.

Such a device is described for example in German Offelegungsschrift No. 22 22 686 and is designed accordingly for gripping automobile body parts and includes a pneumatically or hydraulically longitudinally movable piston connected with correspondingly movable gripping, holding and connecting members. These members are actuated very fast and immediately with full predetermined force. During movement of these movable parts there very likely to occur undesired accidents which can cause different injuries to the operators or simply damages to the movable automobile body parts. Therefore, it is quite advantageous and sometimes simply necessary to control and regulate movement of the piston in order to substantially or entirely eliminate any likelihood of the mentioned accidents and injuries.

It has been recognized that the known gripping arrangements cannot promptly recognize and avert an unexpected situation in which accidents, injuries or any other unexpected disturbance are very likely to occur.

SUMMARY OF THE INVENTION

It is a general object of the present invention to avoid the disadvantages of the prior art gripping arrangements.

More particularly, it is an object of the present invention to provide such a gripping arrangement having one cylinder with a piston movable within the cylinder through a stroke which is uninterruptedly divided at least in two steps of different pressure. It is especially important for pneumatic or hydrualic gripping arrangements in order to avoid any possible accidents or damages of operators to move the piston and the parts movable therewith only with a minimum required urging pressure when these parts move across the dangerous areas, thus assuredly eliminating any possible danger of injuring of the operators.

In pursuance of these objects and others which will become apparent hereafter, one feature of the present invention resides in providing gripping means movable through a predetermined stroke between a rest and a gripping position with first means for urging said gripping means from said rest to said gripping position with a predetermined pressure. The gripping means tend to an undesirably fast movement during at least the initial portion of said stroke. One of the main advantageous features of the present invention resides in providing second means for partially counteracting said pressure during a predetermined initial portion of said stroke, so that said gripping means move under said predetermined pressure only during the remaining portion of its stroke towards said gripping position.

The first means include a double acting differential piston, which is movable in a cylinder up and down to bring the gripping means to the gripping or the rest position respectively. When the piston starts to move to the gripping position the both acting surfaces of the piston, that is the lower circular and the upper annular surfaces are subject to pressure forces from the pressure medium (i.e. gas or liquid) directed opposite to one another, that is the pressure force on the lower circular surface of the piston urges the same upwardly whereas the pressure force on the upper annular surface of the piston urges the same downwardly, thus partially counteracting said pressure force directed upwardly. Thus, at least the initial portion of the predetermined stroke is carried out by the piston under the pressure smaller than said predetermined pressure. In a predetermined point of the stroke, that is advantageously when said gripping means have passed the dangerous areas, the second means cease to counteract the urging pressure on the lower circular surface of the piston, and the same moves further towards said gripping position under the exact predetermined pressure. In other words when the second means cease to counteract the urging pressure only one surface of the piston, that is the lower circular surface, is subject to pressure, exerted from the pressure medium.

Thus, the gripping means move through the predetermined stroke in two steps of different pressure. The pressure of the first initial step is smaler, due to counteracting effect of the second means, than the pressure of the second step when the pressure is equal to the predetermined pressure magnitude. Another advantageous feature of the present invention resides in the fact that there is no interruption between the first and the second steps, that is the gripping means do not stop when the second means cease to counteract, rather keep on moving towards the gripping position but from that moment on under the full predetermined pressure.

The interruption-three two pressure-step movement of the gripping means is exercised only when the same move from the rest towards the gripping position, but not vice versa. This feature renders it possible to move piston and subsequently the gripping member under minimum required pressure force only when said gripping means move across the certain dangerous areas, determined either from security or from any other technological grounds. When the gripping means arrive to a certain point of the predetermined stroke, they are urged from that point on towards the gripping position with the full predetermined pressure. Such a differential pressure piston is especially advantageous when it is desired to clamp, hold, stamp or cut a workpiece where accidents or injuries are very likely to occur during the respective working stroke.

Subdivision of the working stroke into two steps each arranged at the corresponding and most convenient pressure renders it possible to carry out the first step which is usually the most dangerous so as to eliminate substantially or entirely any possibility of injuries or damages during this step. The second step, which is usually a small part of the whole stroke, is carried out with a full predetermined pressure force.

Thus, the double-acting differential piston is initially actuated by the pressure medium from both acting surfaces thereof during its movement in one direction, that is towards said gripping position. In other words, the pressure medium acts upwardly onto the bigger lower surface and downwardly onto the smaller annular upper surface. At the end of the stroke only one surface is actuated by the pressure-medium that is the bigger lower surface in upward direction. Thus, when the piston starts to move upwardly the both sides thereof are actuated by the supplied pressure medium, so that the piston moves upwardly under a pressure differential between the pressure on the lower surface and on the upper annular surface, that is the annular surface of the upper side of the piston surrounding the piston rod. The cross-sectional dimension of the piston rod can be so chosen relative to the cross-sectional dimension of the piston itself as to obtain a required and/or desired resulting pressure force.

Another advantageous feature of the present invention resides in providing a communication between a cylinder pressure chamber below the lower surface of the piston and an annular pressure medium chamber above the upper annular surface of the piston. In accordance with one embodiment of the present invention this communication is employed as a throughgoing passage provided in the piston for communicating between two mentioned chambers. It is also possible to provide this communication within or outside the cylinder, which is accomplished in another embodiment of the present invention. In any case shown in the corresponding embodiments this communication is operative to ensure the flow of the pressure medium between the cylinder chamber and the annular chamber of the cylinder. This communication is provided with a check valve, regardless of whether the communication is provided in the piston or in a different place inside or outside the cylinder, so as to permit the pressure medium flow from the cylinder chamber into the annular chamber but not vice versa. In other words the check valve permits the pressure medium flow from the cylinder chamber in the annular chamber in order to accomplish the double-side action on the piston sides. The pressure medium flow in the opposite direction is prevented, so that the communication, again regardless of its destination, does not render it possible for the pressure medium to flow from the annular chamber into the cylinder chamber. It is to be mentioned, that the check valve can be very easily installed in this communication.

In order to provide an outflow of the pressure medium from the annular chamber the latter may be provided with a connecting passage and an annular channel. They can be so arranged and shaped as to ensure a damping effect at the end of the piston movement upwardly towards the corresponding gripping position. Such a damping action is especially desirable and advantageous in order to avoid a break-down of the gripping means with a gripping lever or any other parts which is likely to take place at the end of the gripping stroke. The connecting passage between the annular chamber and a pressure-medium supplying or receiving port is open for the pressure medium flow permanently, whereas the annular channel becomes closed when the piston during its movement reaches the end portion of its stroke towards the gripping position. Thus, the pressure medium flows into the pressure medium port through the connecting passage permanently and the annular channel only during the certain initial portion of the piston stroke.

In accordance with another embodiment of the present invention the piston may be made solid, that is without the throughgoing passage. Instead, the cylinder may be provided with a conduit for supplying pressure medium from the cylinder chamber into the annular chamber. This conduit may be arranged as a connecting passage in the wall of the cylinder or as a connecting line outside the cylinder. In any case, the pressure medium can flow only in one direction, that is from the cylinder chamber into the annular chamber. In order to accomplish this object the conduit is provided with the corresponding check valve, which permits the pressure medium flow in the mentioned direction depending upon the position of the piston during its stroke.

When the piston is provided with the communicating passage it is advantageous to provide the piston rod with two sealing rings longitudinally spaced (by a predetermined distance) from each other and operative for step-like closing the annual channel. Should the conduit be arranged in or outside of the cylinder instead of the communicating passage in the piston, then the solid piston is provided on its outer circumference with two longitudinally spaced (by a predetermined distance) sealing rings or the like. Such a sealing arrangement is operative for step-like closing the corresponding annular channel between the piston and the cylinder itself.

Upon progressive movement of the piston at the end portion of its stroke the annular channel becomes closed by both sealing rings, thus preventing any pressure medium flow therethrough. From now on the pressure medium can flow in the port from the annular chamber only through the connecting passage. Thus, at the end of the stroke a certain dynamic pressure is exercised on the piston thus ensuring thereon a comtemplated brake and damping effect. The connecting passage of the piston is so arranged thereon that the leading end of the passage is open between the sealing rings. Thus when the sealing rings arrive into the annular channel, the connecting passage becomes closed inside the annular channel so that the pressure medium cannot flow any longer from the cylindrical chamber into the annular chamber.

In order to move the piston in the opposite direction, that it towards the rest position, the pressure medium is supplied from the port and through the connecting passage into the annular chamber of the cylinder. The thusly introduced pressure medium acts onto the upper annular surface of the piston thus urging the same into its rest position.

In the embodiment with the connecting conduit the pressure medium flows from the cylindrical chamber through the conduit located outside the cylinder or through the passage located in the wall of the cylinder into the annular chamber thereof in order to act on the annular surface of the piston. The pressure medium acted upon the bigger circular lower surface of the piston urges the same upwardly towards the gripping position. At the end portion of the piston stroke the connecting conduit becomes closed by the piston so as to prevent any pressure medium flow between the chambers. The piston also closes the channel so as to prevent any pressure medium flow through the same out of the annular chamber into the port. However, the connecting passage is permanently open to permit flow of the pressure medium from the annular chamber in the port.

The pressure medium can be introduced or withdrawn from the cylinder from/to the port which supplies or withdraws the pressure medium selectively in the cylindrical chamber or annular chamber depending on direction of piston movement respectively.

The piston rod or the piston itself can be provided with annular grooves or any other similar arrangements for receiving and holding the sealing rings or any other sealing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
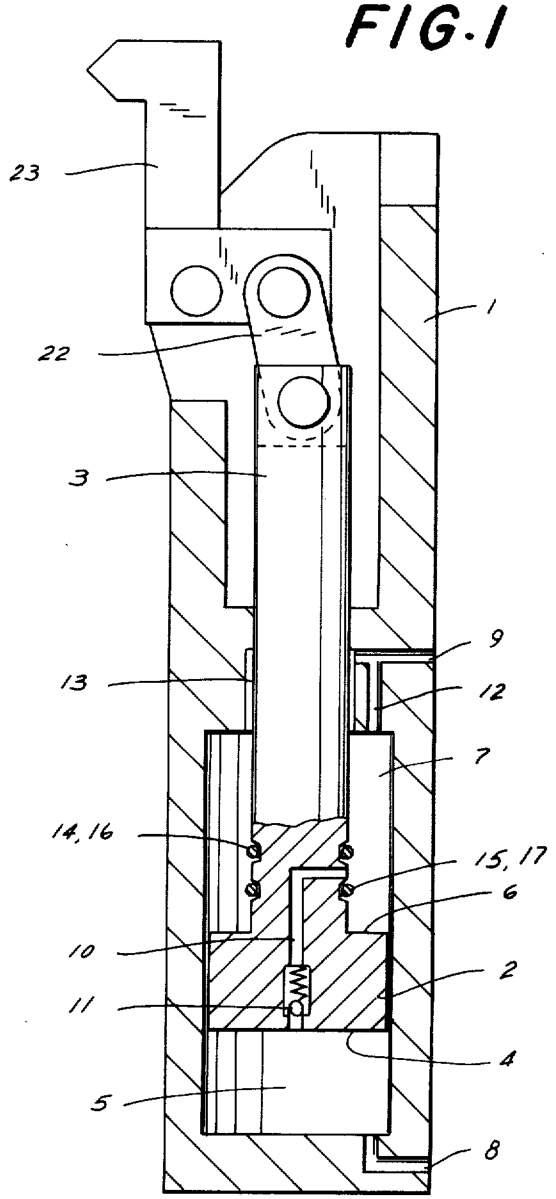
FIG. 1 is a cross-sectional view of a first embodiment of a gripping arrangement in a rest position thereof in accordance with the present invention.

Referring now to the drawings and first to the FIG. 1 thereof, it may be seen that the reference numeral 1 designates a cylinder with a piston 2 axially movable within the cylinder 1. The piston 2 is provided with a piston rod 3. The piston 2 subdivides the interior of the cylinder into a cylindrical chamber 5 located below the bigger circular surface 4 of the piston 2 and an annular chamber 7 located above the annular upper surface 6 surrounding the piston rod 3. The cylindrical chamber 5 is connected with a port (not shown) through a passage 8, so as to supply or withdraw a pressure medium (i.e. gas or fluid) to or from the cylindrical chamber 5, respectively. The annular chamber 7 is also connected with the port, for the same purpose, throgh a passage 9. The piston 2 is provided with a throughgoing passage 10 which extends partially through the piston rod 3. The passage 10 connects the chambers 5 and 7, and is provided with a check valve 11, so located in the passage 10 as to permit the pressure medium flow from the cylindrical chamber 5 in the annular chamber 7 but not vice versa. The passage 9 is so connected with the interior of the annular chamber 7 through a connecting bore 12, that the pressure medium can permanently flow through the bore 12 from the annular chamber 7 into the passage 9 and further into the port. Besides that there is provided an annular channel 13 which bounds an additional passage for flow of the pressure medium from the annular chamber 7 into the port. The piston rod 3 is provided with two annular grooves 14 and 15 operative for receiving therein sealing rings (for example, O-shaped rings) 16 and 17 respectively.

Figure 2:
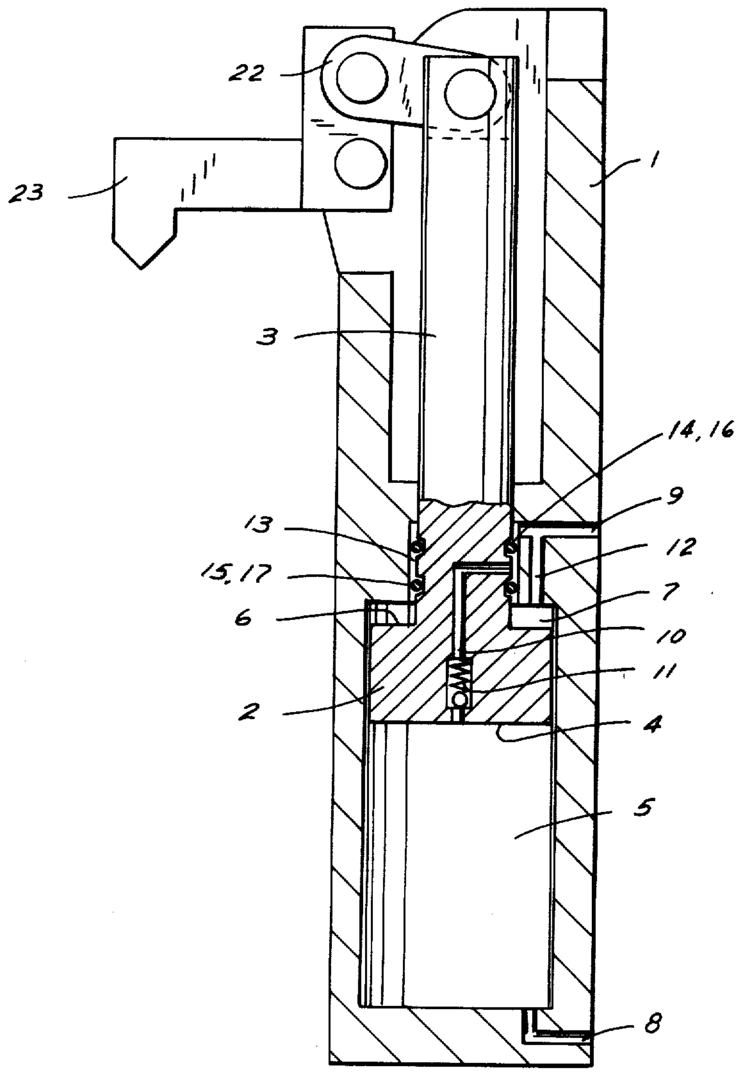
FIG. 2 is a cross-sectional view of the first embodiment of the gripping arrangement in a gripping position thereof.

At the end portion of the stroke (see FIG. 2) of the piston 2 on its movement towards the corresponding gripping position the sealing rings 16 and 18 close the annular channel 13, thus preventing any pressure medium flow through this channel 13. The connecting passage 10 has one end open between the sealing rings 16 and 17. Thus, when the annular channel 13 is closed by the rings 16 and 17, the passage 10 is simultaneously closed by the inside wall of the annular channel 13 and the sealing rings 16 and 17, thus preventing any pressure medium flow from the cylindrical chamber 5. In such a situation the passage 9 communicates with the interior of the annular chamber 7 only through the bore 12 thereby allowing the pressure medium flow into the port from the chamber 7.

Thus, the rings 16 and 17 close the passage 13 step-like depending upon the stroke of the piston. Such a step-like closing advantageously affects the contemplated brake and damping of the piston at the end of the gripping stroke.

Figure 3:
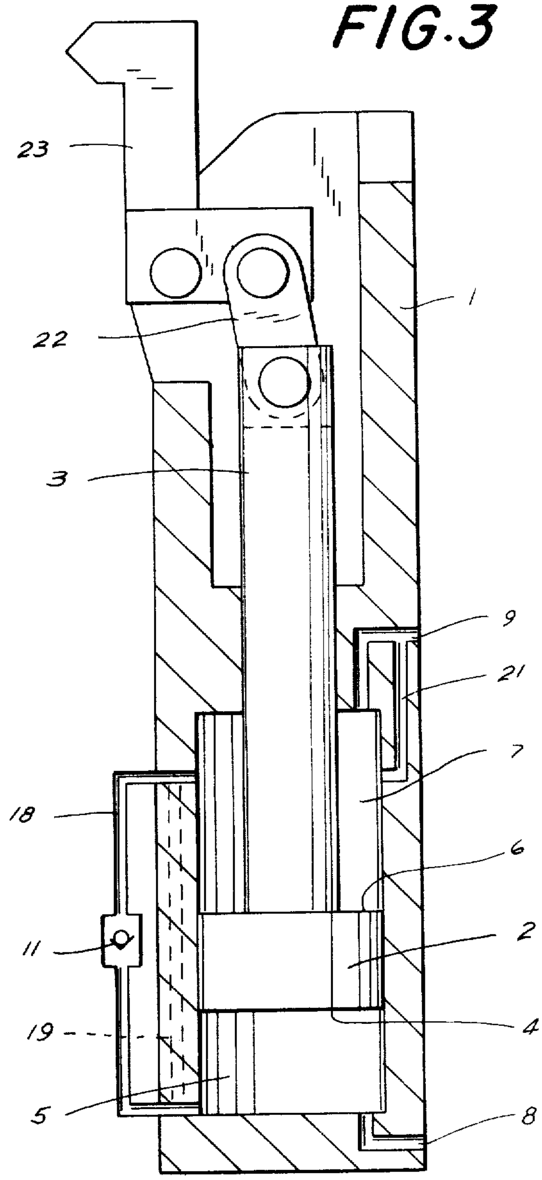
FIG. 3 is a cross-sectional view of a second embodiment of the gripping arrangement in the rest position thereof.
Figure 4:
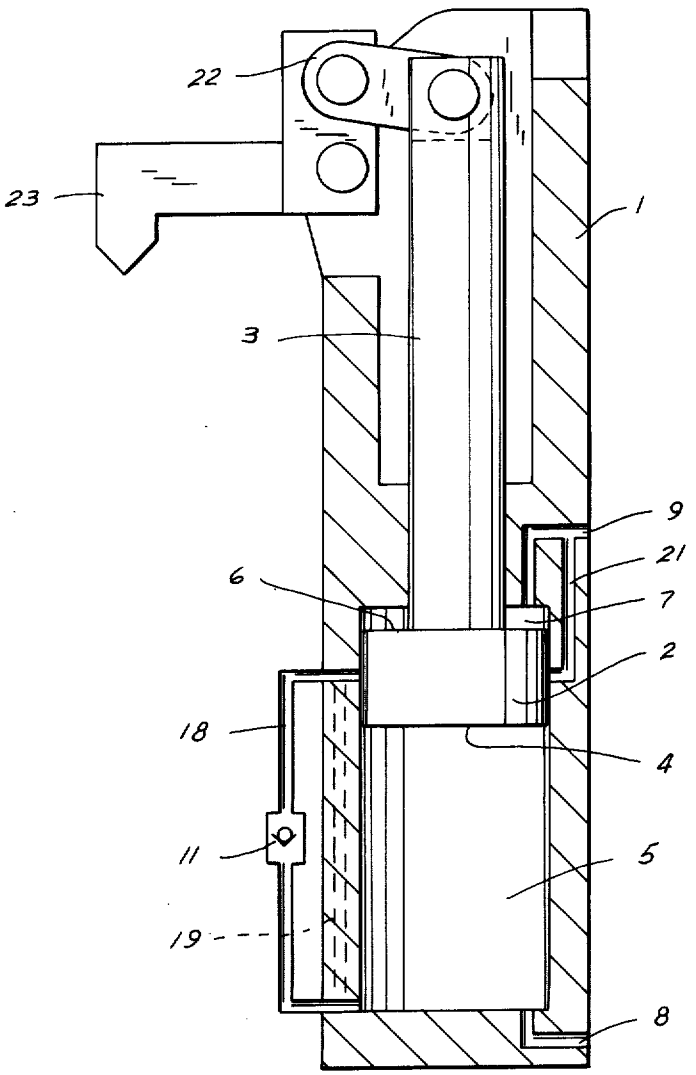
FIG. 4 is a cross-sectional view of the second embodiment of the gripping arrangement in the gripping position thereof.

The FIGS. 3 and 4 show another embodiment of the gripping arrangement. The piston 2 is made solid without any passages whatsoever. Instead, outside the cylinder 1 there is provided a connecting conduit 18 for supplying the pressure medium from the cylindrical chamber 5 into the annular chamber 7. The conduit 18 is provided with the check valve 11 so as to prevent any pressure medium flow from the annual chamber 7 into the cylindrical chamber 5. It is to be understood, that the outside conduit may be also dispensed with, and instead a passage 19 (shown in a dotted line) can be provided in the wall of the cylinder 1 for the same purpose, that is to supply the pressure medium from the chamber 5 into the chamber 7. In this case the check valve 11 is installed in the passage 19. The passage 9 is designed to withdraw therethrough (or introduce therethrough) the pressure liquid from (into) the annular chamber 7 into (from) the port.

At the end portion of the gripping stroke the piston 2 closes the connecting conduit 18 (or the passage 19), so that no pressure medium flow is permissible from the cylindrical chamber 5 into the annular chamber 7. Besides that, the piston 2 in this position closes the open end of channel 21, so that to prevent any pressure medium flow therethrough. Thus no pressure medium can from now on reach the passage 9 through the channel 21. The rest portion of the stroke the piston 2 moves under the comparatively bigger pressure force resulting from action of the pressure medium supplied into the chamber 5 solely onto the surface 4. In order to move the piston in the opposite direction the required pressue medium is supplied from the port and through the passage 9 and the channel 21 into the annular chamber 7, thus urging the piston 2 more in the opposite direction, that is towards the corresponding rest position.

The above discussed embodiments are used for gripping and holding different workpieces. The piston rod 3 is provided at its end with a lever 22 connected with a gripping element 23.

It will be understood that each of the elements described above, or two or more together, may also find a useful application in other types of gripping arrangements differing from the types described above.

While the invention has been illustrated and described as embodied in a gripping arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

I claim:

1. A gripping arrangement comprising gripping means movable through a predetermined stroke between a rest and a gripping position; a cylinder including a double acting piston operatively connected to said gripping means for urging the latter from said rest to said gripping position with a predetermined pressure, said piston subdividing the interior of said cylinder into a lower cylindrical chamber and an upper annular chamber; first communication means between said cylindrical and said annular chambers for partially counteracting said pressure during a predetermined initial portion of said stroke for permitting said gripping means to move under said pressure only during the remaining portion of its stroke toward said gripping position, first connecting means for alternately supplying and withdrawing pressure medium from said cylindrical chamber; second connecting means for alternately supplying and withdrawing pressure medium from said annular chamber; and second communication means arranged between said annular chamber and said second connecting means, said second communication means being closed by said piston when said piston reaches the end portion of said stroke towards the gripping position.

2. An arrangement as defined in claim 1, wherein said first communication means further comprise a check valve operative for permitting said pressure medium flow from said cylindrical chamber into said annular chamber and preventing said pressure medium flow in the opposite direction so that when said pressure medium is supplied into said cylindrical chamber thus exerting said predetermined pressure on said piston to thereby move the same correspondingly toward said gripping position, said pressure medium enters said annular chamber through said first communication means to thereby exert a counteracting pressure on said piston in the opposite direction to thereby partially counteracting said predetermined pressure.

3. An arrangement as defined in claim 2, wherein said piston has a lower surface faced said cylindrical chamber and an upper annular surface surrounding the piston rod and facing said annular chamber, said annular surface having substantially smaller cross-sectional dimension than said lower surface, to thereby ensure that said counteracting pressure is substantially smaller than said predetermined pressure.

4. An arrangement as defined in claim 3, wherein said first communication means include a throughgoing passage provided on said piston having one end open into said cylindrical chamber and another end open into said annular chamber when said piston is in said rest position.

5. An arrangement as defined in claim 4, wherein said throughgoing passage extends at least partially through said piston rod.

6. An arrangement as defined in claim 4, wherein said first communicating means include a conduit located outside said cylindrical and having one end open into said cylindrical chamber and another end open into said annular chamber.

7. An arrangement as defined in claim 4, wherein said first communicating means include a bore provided in the wall of said cylinder and having one end open into said cylindrical chamber and another end open into said annular chamber.

8. An arrangement as defined in claim 3, wherein said second connecting means include a first channel and said second communication means are connected to said first channel.

9. An arrangement as defined in claim 8, wherein said second communication means include a first passage in the wall of the cylinder which is operative for at least temporarily connecting said first channel with the interior of said annular chamber.

10. An arrangement as defined in claim 9, wherein said first passage is an annular longitudinal gap defined between the piston rod and the wall of said cylinder, said longitudinal gap having one end open into said annular chamber and another open end longitudinally spaced from said one end and communicating with said first channel.

11. An arrangement as defined in claim 10, wherein said first passage is a first bore provided in the wall of said cylinder and having one end open into said annular chamber and another end spaced from said first end and open into said first channel.

12. An arrangement as defined in claim 9; and further comprising means for closing said first passage when said piston uninterruptedly moves through said remaining portion of its stroke towards said gripping position, so that when said first passage is closed said first channel communicates with the interior of the annular chamber only through said permanently open bore.

13. An arrangement as defined in claim 12, wherein said communicating means are so adapted as to become closed when said first passage is closed so as to prevent any pressure medium flow from said cylindrical chamber into said annular chamber thus eliminating said counteracting pressure on said piston to permit the same uninterruptedly moves towards said gripping position under said predetermined pressure.

* * * * *